United States Patent
Li et al.

(10) Patent No.: US 10,203,962 B2
(45) Date of Patent: Feb. 12, 2019

(54) TIGERSHARC DSP BOOT MANAGEMENT CHIP AND METHOD

(71) Applicant: CRRC QINGDAO SIFANG ROLLING STOCK RESEARCH INSTITUTE CO., LTD., Qingdao (CN)

(72) Inventors: Zhen Li, Qingdao (CN); Guobin Sun, Qingdao (CN); Xiaosong Zhang, Qingdao (CN)

(73) Assignee: CRRC QINGDAO SIFANG ROLLING STOCK RESEARCH INSTITUTE CO., LTD., Shandong (CN)

( * ) Notice: Subject to any disclaimer, the term of this patent is extended or adjusted under 35 U.S.C. 154(b) by 0 days.

(21) Appl. No.: 15/549,661

(22) PCT Filed: Aug. 15, 2016

(86) PCT No.: PCT/CN2016/095295
§ 371 (c)(1),
(2) Date: Aug. 8, 2017

(87) PCT Pub. No.: WO2017/088531
PCT Pub. Date: Jun. 1, 2017

(65) Prior Publication Data
US 2018/0032346 A1    Feb. 1, 2018

(30) Foreign Application Priority Data

Mar. 28, 2016 (CN) ............... 2016 1 0183445
Mar. 28, 2016 (CN) ............... 2016 2 0246409 U

(51) Int. Cl.
*G06F 9/44* (2018.01)
*G06F 9/4401* (2018.01)

(52) U.S. Cl.
CPC ......... *G06F 9/4401* (2013.01); *G06F 9/44* (2013.01); *G06F 9/4406* (2013.01)

(58) Field of Classification Search
CPC ....... G06F 9/4401; G06F 9/441; G06F 9/4406
See application file for complete search history.

(56) References Cited

U.S. PATENT DOCUMENTS

| 7,761,653 B2 | 7/2010 | Lee et al. ............... 711/103 |
| 2008/0040598 A1 | 2/2008 | Lee et al. ............... 713/2 |

(Continued)

FOREIGN PATENT DOCUMENTS

| CN | 102053849 A | 5/2011 |
| CN | 201886460 U | 6/2011 |

(Continued)

OTHER PUBLICATIONS

The extended European Search Report of corresponding European patent application No. 16867758.1-1224, dated Jan. 29, 2018.

(Continued)

Primary Examiner — Terrell S Johnson
(74) Attorney, Agent, or Firm — J.C. Patents

(57) ABSTRACT

A TigerSharc DSP boot management chip and the method thereof, the boot management chip comprises an interface unit, a two-port RAM unit, a management unit and a DSP download management unit; further comprises a flash drive unit and a NOR flash chip; the management unit is connected to the flash drive unit; the two-port RAM unit is connected to the NOR flash chip via the flash drive unit; and, the NOR flash chip is communicated with the DSP download management unit via the flash drive unit. The management unit provides two booting modes: booting via the NOR flash chip or booting via an external bus; the host boot startup method is improved and two booting program down- (Continued)

load methods are provides, which can greatly improve the booting speed of the TigerSharc DSP chip.

11 Claims, 3 Drawing Sheets

(56) References Cited

U.S. PATENT DOCUMENTS

| | | | |
|---|---|---|---|
| 2008/0098164 A1* | 4/2008 | Lee | G06F 12/0866 711/103 |
| 2008/0320204 A1* | 12/2008 | Jo | G06F 12/0246 711/100 |
| 2018/0032346 A1* | 2/2018 | Li | G06F 9/4401 |

FOREIGN PATENT DOCUMENTS

| | | |
|---|---|---|
| CN | 102135927 A | 7/2011 |
| CN | 102298526 A | 12/2011 |
| CN | 103019774 A | 4/2013 |
| CN | 103389669 A | 11/2013 |
| CN | 105786527 A | 7/2016 |
| JP | 2000-242611 A | 9/2000 |
| JP | 2001-209575 A | 8/2001 |
| JP | 2002-073341 A | 3/2002 |
| JP | 2002-185549 A | 6/2002 |
| JP | 2007-102544 A | 4/2007 |
| JP | 2012-108853 A | 6/2012 |

OTHER PUBLICATIONS

International Search Report of corresponding International PCT Application No. PCT/CN2016/095295, dated Dec. 28, 2016.
Chinese Search Report of corresponding Chinese application No. 2016101834457.
The Japanese Examination Report of corresponding Japan patent application No. 2017-546838, dated Feb. 6, 2018.

* cited by examiner

TIGERSHARC DSP BOOT MANAGEMENT CHIP AND METHOD

CROSS-REFERENCE TO RELATED APPLICATION

This application is a national phase application of international application No. PCT/CN2016/095295 filed on Aug. 15, 2016, which in turn claims the priority benefits of Chinese application No. 201610183445.7, filed on Mar. 28, 2016 and application No. 201620246409.6, filed on Mar. 28, 2016. The contents of these prior applications are hereby incorporated by reference in their entirety.

TECHNICAL FIELD

The present invention belongs to the technical field of digital signal processing, and relates to a boot management chip and boot management method thereof applied in TigerSharc DSP chips.

BACKGROUND OF THE PRESENT INVENTION

TigerSharc DSP chips, as high-performance DSP (Digital Signal Processing) chips produced by ADI, have a very high operation processing capacity and execution efficiency as high as 4800 mMACS; and, the main frequency of the processor is as high as 600 MHz, and the on-chip RAM (Random-Access Memory) reaches 24 Mbits. Two independent computing cores are contained in each chip, and up to four instructions may be executed within a clock cycle. This series of chips support multi-DSP co-processing, at most 8 DSPs, and are applicable in the high-speed and high-performance signal processing fields.

Since there is no on-chip non-volatile program memory in TS20x, programs can only be imported into chips from the outside. There are four program downloading modes: PROM boot, Host boot, LinkPort boot and No boot. Among these modes, the PROM boot mode is frequently used, but it is less secure; the LinkPort boot mode is mainly used for downloading programs between DSP chips, low in universality; the No boot mode is mainly used for debugging, which is generally not recommended to use; and, the Host boot mode has a unique advantage in a co-bus system and may use a host to realize the chip boot via an external bus, and this method can realize good compatibility between TigerSharc DSP chips and other systems. However, in the Host boot mode, since the writing sequence of DSPs is strictly required in the booting process, it is error-prone in the booting process. Moreover, for a long boot code, it is time consuming in the Host boot mode.

The conventional Host boot mode for TigerSharc DSP chips is as follows: boot programs are sent to an AUTODMA port (having a fixed address) of the DSPs by using an external bus of the DSPs. The boot programs are received by the AUTODMA port, and the host has the right to control the bus in the boot process. This boot mode can realize the boot of DSPs more flexibly by using the external bus, and is suitable for downloading programs into TigerSharc DSPs via the common external bus by using an FPGA (Field-Programmable Gate Array) or other processors.

However, there still are the following disadvantages in the conventional Host boot mode.

(1) To ensure the boot stability, in the conventional Host boot mode, a delay is to be added after a boot loader and the first five words of the last session are written into TigerSharc DSP chips. Meanwhile, after each Word is written, the next Word can be written only after the DSP has processed the currently written word, and a non-zero code segment and a zero code segment are processed in different time. If the writing speed is too fast, it is very likely to cause the chips to unable to boot. Since the downloading of code contents in code segments takes most of the time of the whole program downloading process, the writing of each Word needs to wait for the response from TigerSharc DSPs. Thus, the quick boot of the TigerSharc DSPs is influenced. A longer code consumes longer boot time.

(2) The data writing is further restricted by an acknowledgement signal ACK, a bus lock signal BUSLOCK and a bus grant signal HBG. The data can be written only when the acknowledgement signal ACK, the bus lock signal BUSLOCK and the bus grant signal HBG are stable, when the boot logics are satisfied and when the TigerSharc DSPs have been prepared. Otherwise, if there is one data lost, the TigerSharc DSPs cannot be booted.

SUMMARY OF THE PRESENT INVENTION

In view of the deficiencies of too long boot time and low stability in the prior Host boot methods, an objective of the present invention is to provide an improved Host boot management chip and a boot method, i.e., a TigerSharc DSP management chip based on an improved Host boot method, in order to realize the quick boot of a plurality of TigerSharc DSP chips.

The present invention employs the following technical solutions: a TigerSharc DSP boot management chip, comprising an interface unit, a two-port RAM unit, a management unit and a DSP download management unit, wherein the interface unit is connected to the two-port RAM unit and the management unit, respectively; the management unit is connected to an external control system via a control line, and the management unit is further connected to the two-port RAM unit and the DSP download management unit, respectively; the DSP download management unit is connected to at least one TigerSharc DSP chip via a parallel bus, and there are no more than eight TigerSharc DSP chips, that is, one boot management chip drives at most eight DSP chips; the TigerSharc DSP boot management chip further comprises a flash drive unit and a NOR flash chip; the management unit is connected to the flash drive unit; the two-port RAM unit is connected to the NOR flash chip via the flash drive unit; and, the NOR flash chip is communicated with the DSP download management unit via the flash drive unit.

Preferably, the interface unit comprises a PCI (Peripheral Component Interconnect) bus interface, a CAN (Controller Area Network) bus interface and a RS232 bus interface, which are all connected to the management unit and the two-port RAM unit.

Preferably, the TigerSharc DSP boot management chip further comprises a watchdog management circuit which is connected to each TigerSharc DSP chip respectively.

A TigerSharc DSP boot management method using the TigerSharc DSP boot management chip is provided, wherein a boot mode is firstly selected by the management unit;

the management unit performs control to the selection of downloading a TigerSharc DSP boot program via the interface unit, and performs control to the selection of booting via the NOR flash chip or via an external bus;

the external bus is an external bus to which the interface unit is connected, so that a download method of the TigerSharc DSP boot program is that the management unit controls the downloading of the TigerSharc DSP boot program via the interface unit by the external bus, or that the management unit controls the downloading of the TigerSharc DSP boot program by selecting to boot via the NOR flash chip;

if it is selected to boot via the NOR flash chip, the management unit drives the NOR flash chip to download the TigerSharc DSP boot program via the flash drive unit, the TigerSharc DSP boot program is stored into the NOR flash chip, and the TigerSharc DSP boot management chip reads the boot program in the TigerSharc DSP chip via the DSP download management unit; and if it is selected to boot via the external bus, the TigerSharc DSP boot program is transferred to the TigerSharc DSP chip via the two-port RAM unit and the DSP download management unit. The external bus is an external bus to which the interface unit is connected, including but not limited to a PCI bus, a CAN bus and a RS 232 bus. The management unit is configured to control the operation of the interface unit, the two-port RAM unit and the DSP download management unit.

Preferably, the TigerSharc DSP boot program comprises a code segment portion and a Boot loader portion of 256 words. The code segment portion comprises N code segments which are sequentially connected end to end. The number N of the code segments is the same as the number of the TigerSharc DSP chips.

The code segment portion comprises a non-zero code segment, a zero code segment and a final code segment.

The non-zero code segment comprises: (1) header information of the non-zero code segment; (2) a storage address of the non-zero code segment; and (3) content of the non-zero code segment. Wherein, the header information of the non-zero code segment comprises: (1) identifier type information of this code segment (non-zero code segment, zero code segment or final code segment); (2) ID information of the TigerSharc DSP chip to which the non-zero code segment belongs; and, (3) the content length of the non-zero code segment.

The zero code segment comprises: (1) header information of the zero code segment, and (2) a storage address of the zero code segment. Wherein, the header information of the zero code segment comprises: (1) identifier type information of this code segment (non-zero code segment, zero code segment or final code segment); (2) ID information of the TigerSharc DSP chip to which the zero code segment belongs; and, (3) the content length of the zero code segment.

The final code segment comprises: (1) header information of the final code segment; (2) a storage address of the final code segment; and (3) content of the final code segment. Wherein, the header information of the final code segment comprises: (1) identifier type information of this code segment (non-zero code segment, zero code segment or final code segment); (2) ID information of the TigerSharc DSP chip to which the final code segment belongs; and, (3) final code information of 256 words.

Wherein, the Boot loader portion is a program before running a core of the TigerSharc DSP boot program, and is used for initialization, establishing a memory space mapping and adjusting the running environment of the software and hardware.

The Boot loader portion is written into an AutoDMA address of a TigerSharc DSP chip;

ID information of the TigerSharc DSP chip in the code segment is read;

It is judged whether the ID information of the TigerSharc DSP chip in the code segment is equal to the ID information of the TigerSharc DSP chip downloading this program currently; if not, the next code segment is read sequentially; and, if so, it is judged whether this code segment is a final code segment; and if this code segment is not a final code segment, according to the size information and address information of this code segment, the content of this code segment is written into a memory of the corresponding DSP by a DSP parallel bus in a 1-level pipeline read/write manner.

If this code segment is a final code segment, the final code segment is written into the DSP memory, and the booting of this DSP is finished.

Further, when the DSP boot program is updated, the updated program is re-downloaded into the NOR flash chip.

Further, each code segment comprises a non-zero code segment, a zero code segment and a final code segment. The non-zero code segment comprises ID information of the TigerSharc DSP chip to which this code segment belongs, storage address information of the code segment, the size of the code segment and non-zero content information of the code segment; the zero code segment comprises ID information of the TigerSharc DSP chip to which this code segment belongs, storage address information of the code segment and the size of the code segment; and, the final code segment comprises ID information of the TigerSharc DSP chip to which this code segment belongs, and final code information of 256 words.

Further, after the Boot loader portion is written, the flow of reading the header information of the code segment is executed after a delay of 10 μs; and, the flow of writing the final code segment into the DSP memory is as follows: writing the first five words, delaying 10 μs, and then writing the remaining 251 Words.

The present invention has the following beneficial effects:

The present invention provides an improved Host boot design method which enhances the stability of the boot process while increasing the boot speed of TigerSharc DSP chips. Based on the improved Host boot design method, a TigerSharc DSP boot management chip is designed. On one hand, the use difficulty of TigerSharc DSP chips is decreased, and on the other hand, the boot speed and stability of TigerSharc DSP chips is improved.

The present invention can effectively manage the booting of a plurality of TigerSharc DSPs. Thus, the use difficulty of the TigerSharc DSPs is decreased. For an external system, the TigerSharc DSPs may be booted via PCI, CAN, RS232 and parallel buses. Therefore, the present invention provides many incompatible systems with a solution of connecting to TigerSharc DSPs.

The present invention has a watchdog function which can simultaneously manage a plurality of TigerSharc DSPs. When the operation of a certain DSP is abnormal, this DSP can be reset and the program of the DSP can be re-downloaded.

The present invention provides two boot modes. One boot mode is to realize booting via the NOR flash chip. In this mode, the program is directly stored into the NOR flash chip which serves as a temporary storage area of the boot program, and the boot program can be directly called from the NOR flash chip in the subsequent boot process, so that it is only required to re-download the boot program during updating the boot program, rather than reading the boot program from the outside every time. The other boot mode is to directly receive the boot program via an external bus.

This mode is highly secure. The boot mode may be set by the management unit, which is flexible and diverse.

Various external buses such as a PCI bus, a CAN bus and a RS232 bus are provided, so that various bus data formats can be supported.

DETAILED DESCRIPTION OF THE PRESENT INVENTION

The specific implementations of the present invention will be further described in detail with reference to the accompanying drawings.

Figure 1:
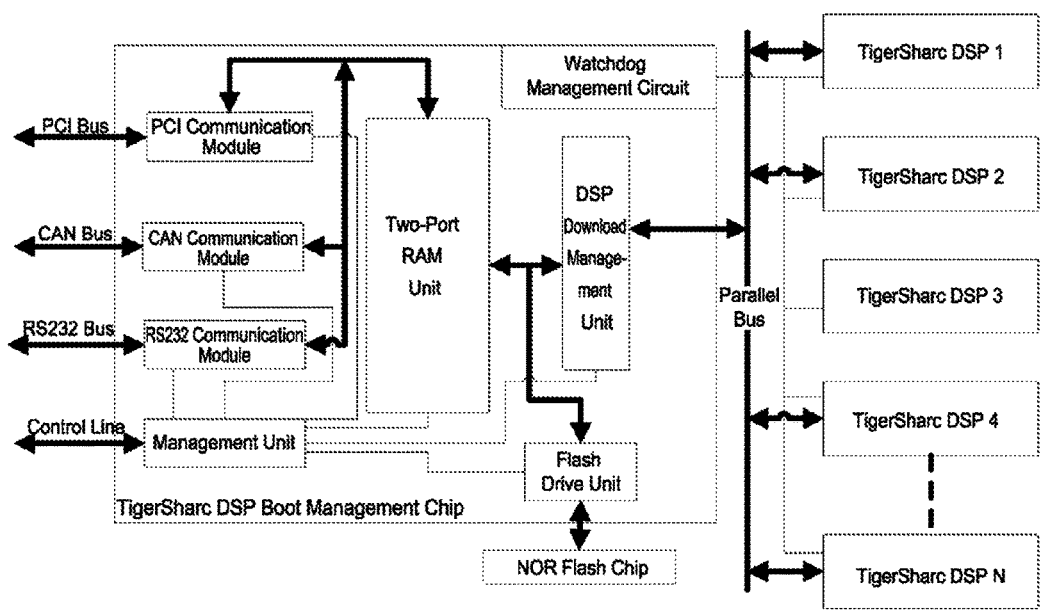
FIG. 1 is a schematic structure diagram of the present invention.

As shown in FIG. 1, a TigerSharc DSP boot management chip is a boot management chip constructed by using an FPGA, comprising an interface unit, a two-port RAM unit, a management unit and a DSP download management unit.

The interface unit comprises a PCI bus interface, a CAN bus interface and a RS232 bus interface which are all connected to the management unit and the two-port RAM unit, and provides various interfaces to an external system via a PCI communication module, a CAN communication module and a RS232 communication module.

The PCI communication module is responsible for an access of the PCI bus via the PCI bus interface; the CAN communication module is responsible for an access of the CAN bus via the CAN bus interface; and the RS232 communication module is responsible for an access of the RS 232 bus via the RS232 bus interface. Wherein, the two-port RAM unit is used to temporarily receive codes, and works as a temporary storage unit for a TigerSharc DSP boot program.

The management unit is connected to an external control system via a control line. The control system is a controller of the FPGA boot management chip, and is configured to issue a boot control instruction. The management unit is also connected to the two-port RAM unit and the DSP download management unit, respectively. The DSP download management unit is connected to at least one TigerSharc DSP chip via a parallel bus, and there are no more than eight TigerSharc DSP chips. In other words, one boot management chip drives at most eight TigerSharc DSP chips. The number of DSP chips which can be driven is mainly limited by an FPGA drive interface.

The management chip further comprises a flash drive unit and a NOR flash chip. The management unit is connected to the flash drive unit. The two-port RAM unit is connected to the NOR flash chip via the flash drive unit. The NOR flash chip is communicated with the DSP download management unit via the flash drive unit. The NOR flash chip is used as a storage chip for the TigerSharc DSP boot program, for storing downloaded TigerSharc DSP boot programs.

This structure of the management chip provides two TigerSharc DSP boot program channels for the TigerSharc DSP boot program to the TigerSharc DSP chip. One TigerSharc DSP boot program channel is that the TigerSharc DSP boot program is downloaded from an external bus via the interface unit, and then transferred to the TigerSharc DSP chip to be booted via the two-port RAM unit and the DSP download management unit. In this case, it is required to re-download the TigerSharc DSP boot program from the external bus every time. The other TigerSharc DSP boot program channel is that the TigerSharc DSP boot program is directly downloaded into the NOR flash chip, and the TigerSharc DSP boot program is directly read from the NOR flash chip every time. When the TigerSharc DSP boot program is updated, the updated TigerSharc DSP boot program is re-downloaded into the NOR flash chip, and the updated TigerSharc DSP boot program is directly read from the NOR flash chip when the chip is to be booted. The selection of the way for downloading the TigerSharc DSP boot program and the selection of channel may be controlled by the management unit.

The system further comprises a watchdog management circuit which is connected to each TigerSharc DSP chip to realize the watchdog management and monitoring of a plurality of TigerSharc DSPs. The DSP accesses to a register of the watchdog management circuit in the management chip via an external bus. When the operation of a TigerSharc DSP(s) is abnormal, the TigerSharc DSP may be reset and the program may be re-downloaded.

A TigerSharc DSP boot management method using the TigerSharc DSP boot management chip is provided, wherein a boot mode is firstly selected by the management unit;

the management unit performs control to the selection of downloading the TigerSharc DSP boot program via the interface unit, and performs control to the selection of booting via the NOR flash chip or via the external bus;

if it is selected to boot via the NOR flash chip, the TigerSharc DSP boot program is stored into the NOR flash chip, and the TigerSharc DSP chip reads the TigerSharc DSP boot program in the TigerSharc DSP chip via the DSP download management unit; and if it is selected to boot via the external bus, the TigerSharc DSP boot program is transferred to the TigerSharc DSP chip via the interface unit, the two-port RAM unit and the DSP download management unit.

Figure 2:
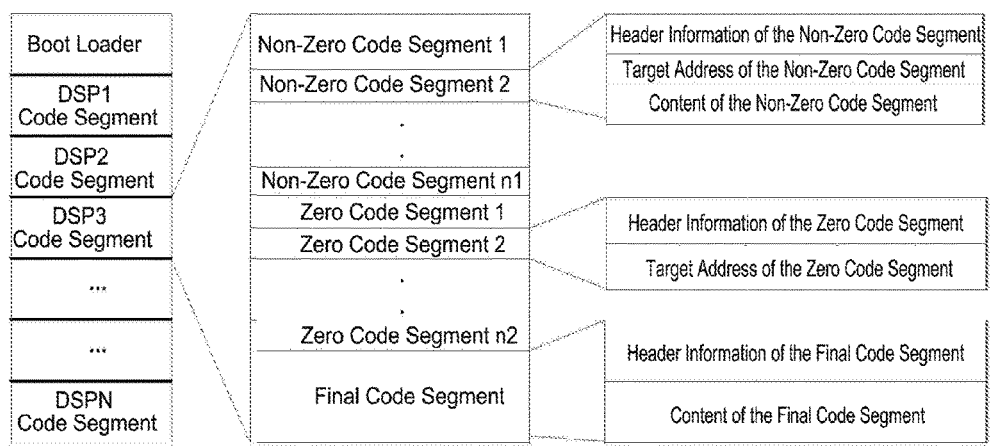
FIG. 2 is a schematic structure diagram of a TigerSharc DSP boot program code.

As shown in FIG. 2, the TigerSharc DSP boot program includes a code segment portion and a Boot loader portion of 256 words. The code segment portion includes N code segments which are sequentially connected end to end. The number N of the code segments is the same as the number of the TigerSharc DSP chips. Each code segment includes ID information of the TigerSharc DSP chip to which this code segment belongs, storage address information of this code segment, and code information.

Taking simultaneously driving eight TigerSharc DSP chips by the boot management chip as example, the code segment portion includes eight code segments, i.e., DSP1 code segment, DSP2 code segment . . . DSP8 code segment. The specific structure of each code segment comprises a non-zero code segment, a zero segment and a final code segment, specifically:

As shown in FIG. 2, the non-zero code segment includes: (1) header information of the non-zero code segment; (2) a storage address of the non-zero code segment; and (3) content of the non-zero code segment. Wherein, the header information of the non-zero code segment includes: (1) identifier type information of this code segment (non-zero code segment, zero code segment or final code segment); (2) ID information of the DSP to which the non-zero code segment belongs (i.e., TigerSharc DSP1, TigerSharc DSP2 . . . TigerSharc DSP8); and, (3) the content length of the non-zero code segment.

The zero code segment includes: (1) header information of the zero code segment, and (2) a storage address of the zero code segment. Wherein, the header information of the zero code segment includes: (1) identifier type information of this code segment (non-zero code segment, zero code segment or final code segment); (2) ID information of the DSP to which the zero code segment belongs; and, (3) the content length of the zero code segment.

The final code segment includes: (1) header information of the final code segment; (2) a storage address of the final code segment; and (3) content of the final code segment. Wherein, the header information of the final code segment includes: (1) identifier type information of this code segment (non-zero code segment, zero code segment or final code segment); (2) ID information of the DSP to which the final code segment belongs; and, (3) final code information with 256 words.

As shown in FIG. 2, the specific format of the N code segments connected end to end mentioned before is as follows: non-zero code segments, zero code segments and the final code segment are connected sequentially, wherein the non-zero code segments include a non-zero code segment 1, a non-zero code segment 2, a non-zero code segment 3 . . . a non-zero code segment n1, which are connected sequentially; and, the zero code segments include a zero code segment 1, a zero code segment 2, a zero code segment 3 . . . a zero code segment n2, which are connected sequentially, wherein both n1 and n2 can be equal to N.

Figure 3:
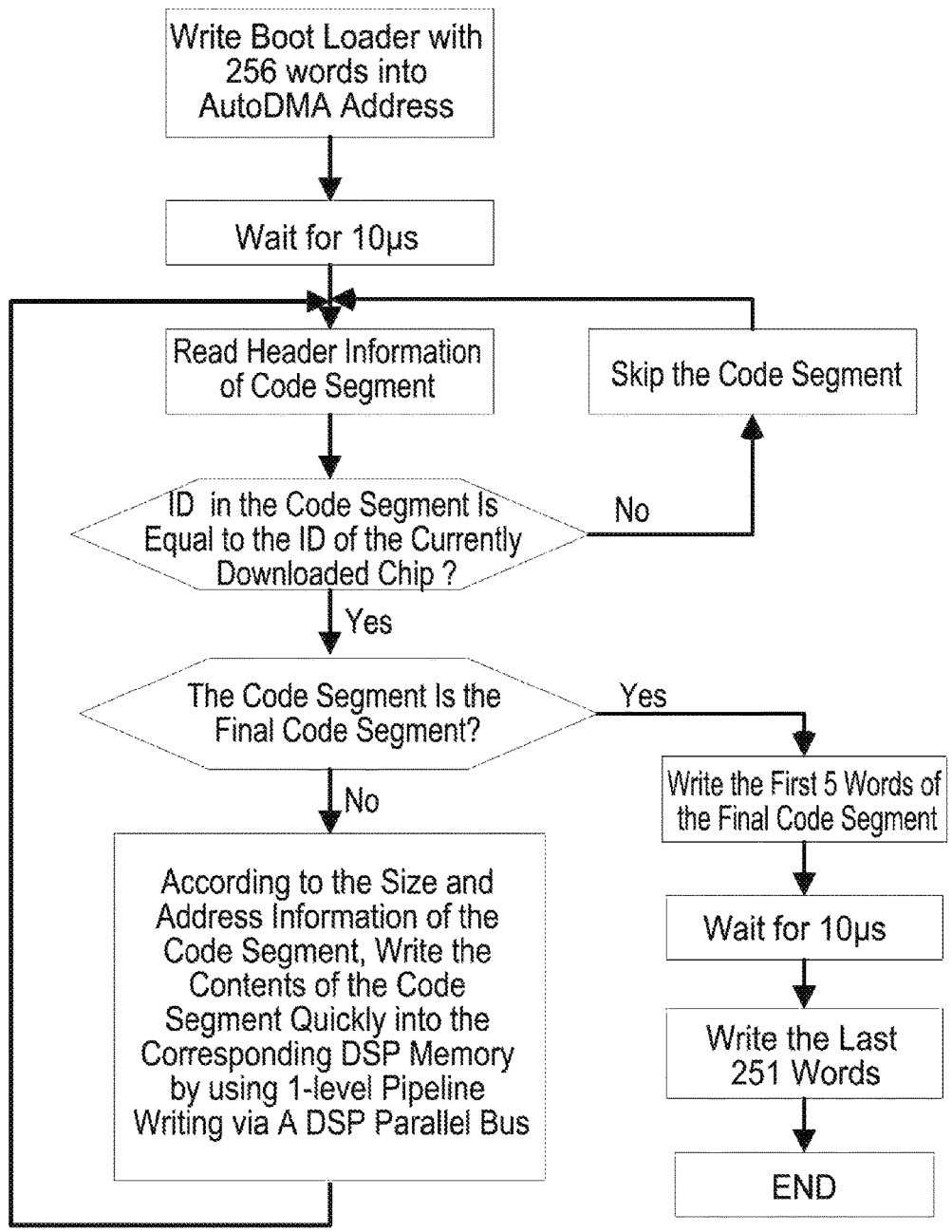
FIG. 3 is a flowchart of a Host boot program of the present invention.

FIG. 3 shows a method flow of using the boot management chip to manage the booting of TigerSharc DSP chips.

The boot loader portion is written into an AutoDMA address of TigerSharc DSP boot management chip, and then the boot program download is initialized.

The ID information of the TigerSharc DSP chip in the code segment is read. The header information of the code segment includes: 1) ID information of DSPs; 2) The attribute of the code segment (non-zero code segment, zero code segment or final code segment); and, 3) the length of the code segment.

It is judged whether the ID information of the DSP boot management chip in a code segment is equal to the ID number of the TigerSharc DSP chip downloading this program currently, i.e., whether the code segment N is matched with the TigerSharc DSP N; if not, the next code segment is read sequentially until the ID number of the DSP boot management chip contained in a code segment is equal to the ID number of the TigerSharc DSP chip downloading this program currently; and, if so, it is judged whether this code segment is a final code segment.

With reference to FIG. 2, more specifically, when reading a code segment and making a judgment thereon, firstly, the non-zero code segment 1, the non-zero code segment 2, the non-zero code segment 3 . . . the non-zero code segment n1 are sequentially read and judge whether the ID number of the DSP boot management chip in a non-zero code segment is matched with the TigerSharc DSP N to be booted; then, the zero code segment 1, the zero code segment 2, the zero code segment 3 . . . the zero code segment n2 are sequentially read and judge whether the ID number of the DSP boot management chip in a zero code segment is matched with the TigerSharc DSP N to be booted; and finally, the final code segment is read.

If this code segment is not a final code segment, that is, if the read code segment is a non-zero code segment or a zero code segment, according to the size information and address information of this code segment, the content of this code segment is written into a memory of the corresponding TigerSharc DSP (i.e., the TigerSharc DSP to be booted) by a DSP parallel bus in a 1-level pipeline write manner.

If this code segment is a final code segment, the final code segment is written into the memory of the corresponding TigerSharc DSP to be booted, and the TigerSharc DSP boot program is downloaded.

After the Boot loader portion is written, the flow of reading the header information of the code segment is executed after a delay of 10 μs; and, the flow of writing the final code segment into the DSP memory is as follows: writing the first five words, delaying 10 μs, and then writing the remaining 251 words.

In the improved Host boot mode, a pipeline mechanism for TigerSharc DSPs is applied in the standard Host boot process. When downloading the code segments, the AutoDMA writing mechanism is replaced by the pipeline writing mechanism. Since the TigerSharc DSPs use a common external bus design, reading/writing from/to the on-chip memory may be done via the external bus. The use of 1-level pipeline writing promises a very high writing speed at which one word may be written within one DSP clock cycle. In this way, in comparison with the AutoDMA mode, the time for writing the code content is reduced greatly, and the time for downloading the whole program is thus reduced.

What is claimed is:

1. A DSP boot management chip, comprising an interface unit, a two-port RAM unit, a management unit and a DSP download management unit; wherein
    the interface unit is connected to the two-port RAM unit and the management unit, respectively;
    the management unit is connected to an external control system via a control line, and the management unit is further connected to the two-port RAM unit and the DSP download management unit, respectively;
    the DSP download management unit is connected to at least one DSP chip via a parallel bus;
    the DSP boot management chip further comprises a flash drive unit and a NOR flash chip; the management unit is connected to the flash drive unit; the two-port RAM unit is connected to the NOR flash chip via the flash drive unit; and, the NOR flash chip is communicated with the DSP download management unit via the flash drive unit;
    the management unit is configured to perform control to the selection of downloading a DSP boot program via the interface unit by an external bus, or perform control to the selection of downloading the DSP boot program by the NOR flash chip, and the management unit is configured to perform control to the selection of booting via the NOR flash chip or via an external bus;
    the management unit is further configured to, when selecting to boot via the NOR flash chip, drive the NOR flash chip to download the DSP boot program via the flash drive unit, so that the DSP boot program is stored into the NOR flash chip, and the DSP chip reads the DSP boot program in the DSP boot management chip via the DSP download management module; and
    when selecting to boot via the external bus, the DSP boot program is transferred to the DSP chip via the two-port RAM unit and the DSP download management unit.

2. The DSP boot management chip according to claim 1, wherein the interface unit comprises a PCI bus interface, a CAN bus interface and a RS232 bus interface, which are all connected to the management unit and the two-port RAM unit.

3. The DSP boot management chip according to claim 2, further comprising a watchdog management circuit which is connected to each DSP chip respectively.

4. The DSP boot management chip according to claim 1, further comprising a watchdog management circuit which is connected to each DSP chip respectively.

5. A DSP boot management method using a DSP boot management chip, wherein, the DSP boot management chip comprises an interface unit, a two-port RAM unit, a management unit and a DSP download management unit;
the interface unit is connected to the two-port RAM unit and the management unit, respectively;
the management unit is connected to an external control system via a control line, and the management unit is further connected to the two-port RAM unit and the DSP download management unit, respectively;
the DSP download management unit is connected to at least one DSP chip via a parallel bus;
the DSP boot management chip further comprises a flash drive unit and a NOR flash chip; the management unit is connected to the flash drive unit; the two-port RAM unit is connected to the NOR flash chip via the flash drive unit; and, the NOR flash chip is communicated with the DSP download management unit via the flash drive unit;
wherein, the DSP boot management method comprises:
performing, by the management unit, control to the selection of downloading a DSP boot program via the interface unit by an external bus, or performing control to the selection of downloading a DSP boot program by the NOR flash chip; and performing, by the management unit, control to the selection of booting via the NOR flash chip or via the external bus;
when selecting to boot via the NOR flash chip, driving, by the management unit, the NOR flash chip to download the DSP boot program via the flash drive unit, so that the DSP boot program is stored into the NOR flash chip, and wherein the DSP chip reads the DSP boot program in the DSP boot management chip via the DSP download management unit; and
when selecting to boot via the external bus, the DSP boot program is transferred to the DSP chip via the two-port RAM unit and the DSP download management unit.

6. The DSP boot management method according to claim 5, wherein,
the DSP boot program comprises a code segment portion and a Boot loader portion with 256 words; the code segment portion comprises N code segments which are sequentially connected end to end; the number N of the code segments is the same as the number of the DSP chips; each code segment includes ID information of the DSP chip to which this code segment belongs, storage address information of this code segment, and final code information with 256 words;
the Boot loader portion is written into an AutoDMA address of the DSP chip;
ID information of the DSP chip in the code segment is read;
it is judged whether the ID information of the DSP chip in the code segment is equal to the ID information of a DSP chip downloading this program currently; if not, the next code segment is read sequentially; and, if so, it is judged whether this code segment is a final code segment; and
if this code segment is not a final code segment, according to the size information and address information of this code segment, the content of this code segment is written into a memory of the corresponding DSP by a DSP parallel bus in a 1-level pipeline write manner;
if this code segment is a final code segment, the final code segment is written into the DSP memory.

7. The DSP boot management method according to claim 6, wherein,
when the DSP boot program is updated, the updated program is re-downloaded into the NOR flash chip.

8. The DSP boot management method according to claim 6, wherein,
the code segment comprises a non-zero code segment, a zero segment and a final code segment;
the non-zero code segment includes: (1) header information of the non-zero code segment; (2) a storage address of the non-zero code segment; and, (3) content of the non-zero code segment; wherein, the header information of the non-zero code segment includes: (1) identifier type information of this code segment; (2) ID information of the DSP chip to which the non-zero code segment belongs; and, (3) a content length of the non-zero code segment;
the zero code segment includes: (1) header information of the zero code segment, and (2) a storage address of the zero code segment; wherein, the header information of the zero code segment includes: (1) identifier type information of this code segment; (2) ID information of the DSP boot management chip to which the zero code segment belongs; and, (3) a content length of the zero code segment;
the final code segment includes: (1) header information of the final code segment; (2) a storage address of the final code segment; and, (3) content of the final code segment; wherein, the header information of the final code segment includes: (1) identifier type information of this code segment; (2) ID information of the DSP chip to which the final code segment belongs; and, (3) final code information with 256 words;
the identifier type information of the code segment includes: non-zero code segment, zero code segment, and final code segment.

9. The DSP boot management method according to claim 5, wherein,
when the DSP boot program is updated, the updated program is re-downloaded into the NOR flash chip.

10. The DSP boot management method according to claim 5, wherein,
the code segment comprises a non-zero code segment, a zero segment and a final code segment;
the non-zero code segment includes: (1) header information of the non-zero code segment; (2) a storage address of the non-zero code segment; and, (3) content of the non-zero code segment; wherein, the header information of the non-zero code segment includes: (1) identifier type information of this code segment; (2) ID information of the DSP chip to which the non-zero code segment belongs; and, (3) a content length of the non-zero code segment;
the zero code segment includes: (1) header information of the zero code segment, and (2) a storage address of the zero code segment; wherein, the header information of the zero code segment includes: (1) identifier type information of this code segment; (2) ID information of the DSP chip to which the zero code segment belongs; and, (3) a content length of the zero code segment;
the final code segment includes: (1) header information of the final code segment; (2) a storage address of the final code segment; and, (3) content of the final code segment; wherein, the header information of the final code segment includes: (1) identifier type information of this code segment; (2) ID information of the DSP chip to which the final code segment belongs; and, (3) final code information with 256 words;

the identifier type information of the code segment includes: non-zero code segment, zero code segment, and final code segment.

11. The DSP boot management method according to claim 10, wherein, after the Boot loader portion is written, a flow of reading the header information of the code segment is executed after a delay of 10 μs; and, a flow of writing the final code segment into the DSP memory is as follows: writing the first five words, delaying 10 μs, and then writing the remaining 251 words.

* * * * *